United States Patent
Hilton et al.

(10) Patent No.: US 9,496,996 B2
(45) Date of Patent: Nov. 15, 2016

(54) COMMUNICATIONS SYSTEM AND BIT-LOADING METHOD USED IN A COMMUNICATIONS SYSTEM

(75) Inventors: Christopher David Hilton, Berkshire (GB); Mehul Mehta, Berkshire (GB); Michael Paul Baker, Reading (GB)

(73) Assignee: XSILON LTD, Reading (GB)

( * ) Notice: Subject to any disclaimer, the term of this patent is extended or adjusted under 35 U.S.C. 154(b) by 219 days.

(21) Appl. No.: 14/234,552

(22) PCT Filed: Jun. 15, 2012

(86) PCT No.: PCT/GB2012/051380
§ 371 (c)(1),
(2), (4) Date: Jan. 23, 2014

(87) PCT Pub. No.: WO2012/172361
PCT Pub. Date: Dec. 20, 2012

(65) Prior Publication Data
US 2014/0241309 A1    Aug. 28, 2014

(30) Foreign Application Priority Data
Jun. 15, 2011   (GB) .................................. 1110139.1

(51) Int. Cl.
*H04J 4/00* (2006.01)
*H04L 5/00* (2006.01)
*H04B 3/54* (2006.01)

(52) U.S. Cl.
CPC .............. *H04L 5/0016* (2013.01); *H04B 3/54* (2013.01); *H04L 5/0046* (2013.01); *H04B 2203/5416* (2013.01); *H04B 2203/5454* (2013.01)

(58) Field of Classification Search
USPC ....... 370/326, 330, 335, 342, 343, 345, 436, 370/478, 479, 480
See application file for complete search history.

(56) References Cited

U.S. PATENT DOCUMENTS

| 5,790,551 | A | * | 8/1998 | Chan ................. H04W 74/0866 370/348 |
| 5,959,979 | A | * | 9/1999 | Stratmoen ................. H04L 5/16 370/276 |
| 6,215,762 | B1 | * | 4/2001 | Dent ..................... H04B 1/707 370/208 |
| 7,515,640 | B1 | * | 4/2009 | Barsoum .................. H04L 1/04 370/525 |
| 7,756,002 | B2 | | 7/2010 | Batra et al. |

(Continued)

FOREIGN PATENT DOCUMENTS

| EP | 2120413 A1 | 11/2009 |
| EP | 2154804 A1 | 2/2010 |

OTHER PUBLICATIONS

British Search report for corresponding application GB1110139.1 filed Jun. 15, 2011; Report Dated Sep. 21, 2011.

(Continued)

*Primary Examiner* — Kwang B Yao
*Assistant Examiner* — Nguyen Ngo
(74) *Attorney, Agent, or Firm* — Cantor Colburn LLP (57) ABSTRACT

A communications system comprises a transmitter, receiver and channel. The transmitter transmits multiple copies of each data bit in a multi-dimension modulation scheme matrix, the dimensions being selected from frequency, time and code. Each dimension is divided into sub-groups. A bit-loading method is used such that copies of each data bit (b11, b12, b13) are allocated within the matrix according to a predetermined arrangement so that within each dimension copies of the same data bit reside within different sub-groups.

32 Claims, 4 Drawing Sheets

(56) References Cited

U.S. PATENT DOCUMENTS

| | | | |
|---|---|---|---|
| 2004/0070912 A1* | 4/2004 | Kopp | H04B 3/54 361/119 |
| 2004/0208139 A1 | 10/2004 | Iwamura | |
| 2005/0111590 A1 | 5/2005 | Fang et al. | |
| 2005/0276224 A1* | 12/2005 | Jiang | H04L 1/1812 370/236 |
| 2006/0192537 A1 | 8/2006 | Hagen et al. | |
| 2008/0031369 A1 | 2/2008 | Li et al. | |
| 2008/0101441 A1 | 5/2008 | Palanki et al. | |
| 2009/0307540 A1 | 12/2009 | Razazian et al. | |
| 2010/0085934 A1* | 4/2010 | Wang | H04L 5/0044 370/330 |
| 2010/0322327 A1 | 12/2010 | Caire et al. | |
| 2013/0094517 A1* | 4/2013 | Kim | H04L 29/02 370/474 |

OTHER PUBLICATIONS

International Search Report for corresponding application PCT/GB2012/051380 filed Jun. 15, 2012; Mail date Oct. 30, 2012.
Written Opinion for corresponding application PCT/GB2012/051380 filed Jun. 15, 2012; Mail date Oct. 30, 2012.

* cited by examiner

COMMUNICATIONS SYSTEM AND BIT-LOADING METHOD USED IN A COMMUNICATIONS SYSTEM

This invention relates to a communications system and a bit-loading method used in a communications system. In particular, the invention relates to a power line communications system where multiple copies of data bits are sent in a multi-dimension modulation scheme matrix, the dimensions being selected from frequency, time and code.

In digital modem design the coding and modulation schemes are chosen to maximize performance in terms of data throughput and robustness whilst minimizing the complexity of design. Robustness is typically characterized by the signal-to-noise ratio performance but also refers to immunity to interferers or noise bursts. A low complexity design can result in low cost, a small footprint and low power consumption. Good performance and low complexity are typically contradictory requirements and so modem design involves finding the best compromise to suit the application.

Some modem systems are designed to transmit as much information as possible between source and destination and in such systems the data rate, in bits per second, usually exceeds the channel bandwidth, measured in Hertz. Examples of such systems are audio-visual entertainment systems, where large amounts of information have to be transferred to support television pictures.

Other applications have a data rate requirement that is small compared to the available bandwidth. Such systems are the subject of this application.

In applications in which there is a fixed data rate requirement the performance goal is robustness in terms of reliability of transmission. An example of such an application is the transmission of data from electrical devices in the home or other building to a central hub, such as a smart meter, indicating status and power consumption of the devices. By return the central hub may transmit instructions to an electrical device, for example to turn the electrical device on or off. In this case the required data rate is fixed by the maximum number of nodes that might exist in the premises and the amount of information that is to be communicated. In this application the data may be transmitted over the mains AC power lines between any connected device and the hub.

The frequency band between 1 MHz and 30 MHz is often used for broad-band in-home communications systems with data rates up to about 200 Mbits per second, for example the system described in "HomePlug AV White Paper", HomePlug Powerline Alliance, 2005, the contents of which are incorporated herein by reference. This band is also a good candidate for the type of energy monitoring and management system described above, but in this case a typical total data rate is only about 100 kbits per second. Thus such an application belongs to the class in which the data requirement is much smaller than the available bandwidth.

One method for achieving high reliability of throughput in a system for which the bandwidth exceeds the data rate is to use a very low rate forward error correction code (FEC). This provides very good performance but at the cost of high complexity in the receiver.

U.S. Pat. No. 7,756,002 describes a system where several copies of the data are transmitted, each copy of any given bit being transmitted at a different time and frequency thus making use of the diversity of an ultra-wide band (UWB) channel. Only a fraction of the total available bandwidth for each transmitted symbol is used and the used frequency sub-band is moved with each symbol. However, this method leaves most of the available band unused on any given symbol and thus does not make optimal use of the available channel.

According to a first aspect of the invention there is provided a bit-loading method for loading multiple copies of data bits in a multi-dimension modulation scheme matrix, the dimensions being selected from frequency, time and code, each dimension being divided into sub-groups, the method comprising allocating copies of each data bit within the matrix according to a predetermined arrangement so that within each dimension copies of the same data bit reside within different sub-groups.

In one embodiment the dimensions comprise code and time and the modulation scheme may be code division multiple access (CDMA).

In a further embodiment the dimensions comprise frequency and time and the modulation scheme is chosen from one of frequency division multiplexing (FDM), orthogonal frequency division multiplexing (OFDM), frequency hopping spread spectrum (FHSS) and multi-carrier spread spectrum (MCSS).

When the transmission method is OFDM, the frequency dimension may be divided into sub-groups of sub-carriers and the time dimension may be divided into sub-groups of symbols.

Within each dimension the predetermined arrangement may specify positions within first and second sub-groups of respective first and second copies of a data bit such that the position of the second copy of the data bit is specified according to a progression with respect to the position of the first copy of the data bit.

The progression for one or more dimension may be based on a predetermined function, for example, the progression for one or more dimension may be based on a pseudo-random number generator function or the progression for one or more dimension may be based on a fixed or non-fixed offset.

The predetermined arrangement may be selected based on channel and/or interference characteristics and the choice of predetermined arrangement may be changed dynamically as the channel or interference changes.

A separation between sub-groups used for copies of the same data bit in the frequency dimension may be greater than a coherence bandwidth of the channel.

A separation between sub-groups used for copies of the same data bit in the time dimension may be greater than the maximum delay spread of the channel.

For each sub-group used in a first dimension all sub-groups may be fully populated in a second dimension. The sub-groups used in the first dimension may be contiguous or non-contiguous.

The fully populated sub-groups in the second dimension may be populated with data bits and pad bits.

According to a second aspect of the invention there is provided a multi-dimension modulation scheme transmission method, the dimensions being selected from frequency, time and code, the method comprising: receiving data bits to be transmitted; loading multiple copies of data bits in a multi-dimension modulation scheme matrix according to the method described above; modulating a signal in accordance with the modulation scheme; and transmitting the modulated signal.

The transmitted signal may be transmitted wirelessly, via an electrical cable or via an optical cable.

The transmitted signal may be transmitted via a power line network. The power line network may be within a building or between buildings.

The data bits may or may not be encoded according to a forward error correction scheme.

According to a further aspect of the invention there is provided a bit-loading module for loading multiple copies of data bits in a multi-dimension modulation scheme matrix, the dimensions being selected from frequency, time and code, each dimension being divided into sub-groups, wherein the module is configured to allocate copies of each data bit within the matrix according to a predetermined arrangement so that within each dimension copies of the same data bit reside within different sub-groups.

The dimensions may comprise code and time and the modulation scheme may be code division multiple access (CDMA).

The dimensions may comprise frequency and time and the modulation scheme is chosen from one of frequency division multiplexing (FDM), orthogonal frequency division multiplexing (OFDM) and a spread spectrum modulation scheme such as frequency hopping spread spectrum (FHSS) and multi-carrier spread spectrum (MCSS).

When the transmission method is OFDM, the frequency dimension may be divided into sub-groups of sub-carriers and the time dimension may be divided into sub-groups of symbols.

Within each dimension the predetermined arrangement may specify positions within first and second sub-groups of respective first and second copies of a data bit such that the position of the second copy of the data bit is specified according to a progression with respect to the position of the first copy of the data bit.

The progression for one or more dimension may be based on a predetermined function.

The progression for one or more dimension may be based on a pseudo-random number generator function.

The progression for one or more dimension may be based on a fixed or non-fixed offset.

The predetermined arrangement may be selected based on channel and/or interference characteristics. The choice of predetermined arrangement may be changed dynamically as the channel or interference changes.

A separation between sub-groups used for copies of the same data bit in the frequency dimension may be greater than a coherence bandwidth of the channel.

A separation between sub-groups used for copies of the same data bit in the time dimension may be greater than the maximum delay spread of the channel.

For each sub-group used in a first dimension all sub-groups may be fully populated in a second dimension. The sub-groups used in the first dimension may be contiguous or non-contiguous.

The fully populated sub-groups in the second dimension may be populated with data bits and pad bits.

According to a further aspect of the invention there is provided a transmitter comprising: means for receiving data bits to be transmitted; a bit-loading module for loading multiple copies of data bits in a multi-dimension modulation scheme matrix as described above; means for modulating a signal in accordance with the modulation scheme; and means for transmitting the modulated signal.

The transmitted signal may be transmitted wirelessly, via an electrical cable or via an optical cable.

The transmitted signal may be transmitted via a mains power line.

The mains power line may be within a building or between buildings.

The data bits may or may not be encoded according to a forward error correction scheme.

According to a further aspect of the invention there is provided a receiver comprising: means for receiving a modulated signal; means for demodulating a signal in accordance with a multi-dimension modulation scheme, the dimensions being selected from frequency, time and code; a decoding module for decoding multiple copies of data bits allocated in a multi-dimension modulation scheme matrix, the multiple copies have been allocated using a method as described above; and means for determining a value of received data bits.

The value of the received data bits may be determined by a majority vote using the received values of each copy of that bit.

The value of the received data bits may be determined by a majority vote using the received values of a subset of the copies of that bit.

The subset of copies may be determined according to a confidence threshold in the value of each copy.

The value of each data bit at the receiver may be determined by calculating a weight representing a confidence in the value of each received copy of that bit, and combining the weights from each copy to reach a decision.

The weights may be determined according to information about the signal-to-noise ratio of each received copy of the data bit.

The value of each received bit may be determined according to a maximum likelihood basis.

Each data bit value may be determined by summing an analogue representation of the repeated copies of that data bit.

Each data bit value may be determined by applying a weighting factor to the analogue received value to each copy of that data bit dependent on the signal-to-noise ratio of the sub-group on which that copy was modulated and summing the weighted analogue representations of all copies of that data bit.

The data bit value may be determined by using an algorithm that adapts the recombination method according to the prevailing conditions.

According to a further aspect of the invention there is provided a modem comprising: a transmitter as described above and a receiver as described above.

According to a further aspect of the invention there is provided a communications system comprising: a transmitter as described above for transmitting a signal; a channel on which the transmitted signal is to be carried; and a receiver as described above for receiving the transmitted signal.

According to a further aspect of the invention there is provided a communications system comprising a channel and a plurality of modems as described above. The channel may be a mains power line.

Each modem is part of or associated with an electrical device connected to the power line.

According to a further aspect of the invention there is provided a carrier medium carrying computer readable code for controlling a microprocessor to carry out the method as described above.

By distributing copies of each data bit in this way, large attenuation of the signal, narrow-band interferers and burst noise can be addressed. Since the modulation and coding method is not overly complicated, the modem can be small, cheap and have low power consumption.

Further, full or near-full use of the available channel is undertaken whilst avoiding complex error correction.

Data can be transmitted using the orthogonal frequency division multiplex (OFDM) modulation scheme over the entire available bandwidth. Each data bit to be transmitted is transmitted several times. Each repetition of the bit is on a different OFDM sub-channel, so on a different frequency, and in a different symbol, so at a different time. This provides a robust method of communication making full use of the available bandwidth but not requiring any complex coding. As such it represents a useful improvement to existing coding and modulation schemes for applications of the type described here. The bit loading method can be described as frequency-time repetition coding.

Aspects of the invention and preferred features are set out in the accompanying claims and the following description.

The present invention can be implemented in any convenient form, for example using dedicated hardware, or a mixture of dedicated hardware and software. The present invention may be implemented as computer software implemented by one or more processing apparatuses. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any conventional carrier medium. The carrier medium can comprise a read only memory, hard disk and so on or a transient carrier medium such as an electrical, optical, microwave, acoustic or radio frequency signal carrying the computer code.

The invention will be further described by way of example with reference to the accompanying drawings in which.

Figure 1:
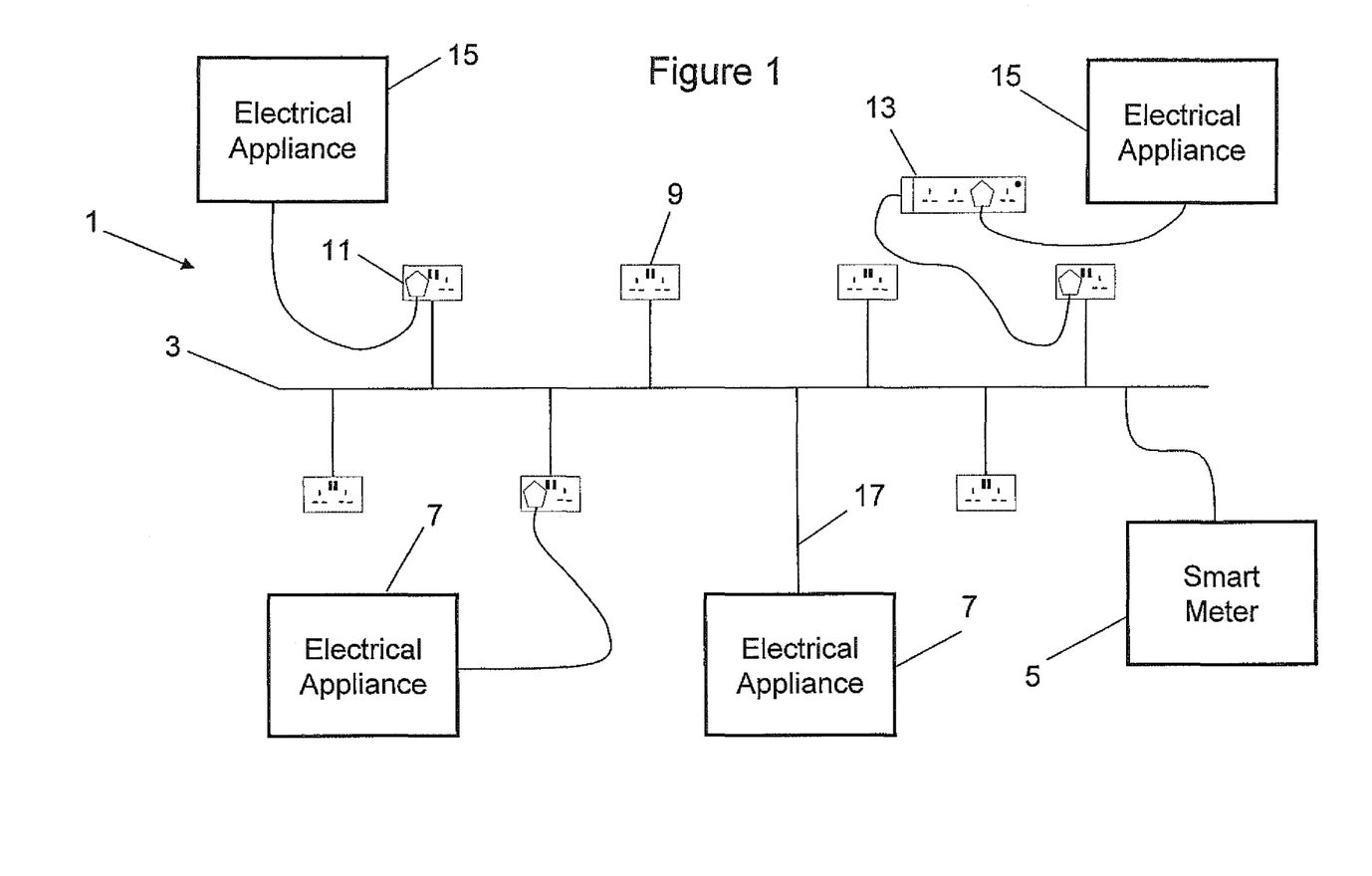
FIG. 1 is a schematic representation of a power line network forming an embodiment of the invention.

FIG. 1 shows a power line communications network 1 forming an embodiment of the invention. Signals are transmitted in AC mains power lines 3. In this embodiment the network 1 is used for a home energy monitoring and management system, but the network 1 may be used for other applications. A smart meter 5 is connected to the power lines 3 within the home. The smart meter 5 includes a modem, an example of which is shown in greater detail in FIG. 2, which communicates with a similar modem associated with electrical devices 7, 15 that receive mains electrical power from the power line 3 through standard sockets 9 or through a permanently wired connection 17. In the case of electrical appliances 7, the modem is incorporated in the electrical device 7. In the case of electrical appliances 15, there is no modem incorporated in the device 15 itself; rather, the modem is incorporated in the mains plug 11 of the device 15, incorporated in a power adapter 13 such as a multi-way extension lead to which the device 15 is connected or otherwise connected to the electrical device 15.

The smart meter 5 and modems associated with the electrical devices 7, 15 send and receive messages containing information relating to the energy usage or status of the devices 7, 15. The smart meter 5 thus receives information from each modem associated with a device 7, 15 which is attached to the power line 3 that is equipped with sensors and means for communicating data to the smart meter 5. The smart meter 5 may be configured to send instructions to the electrical device 7, the electrical plug 11 and the adapter 13, to turn the device 7, 15 on or off, or to control its energy consumption if the device 7, 15 is equipped with appropriate relay switches, means of controlling power consumption or similar. The smart meter 5 may also communicate other information to the devices 7, power plug 11 and power adapter 13 such as, but not limited to, the need for service, the number of hours of operation, temperature, time which is required.

Although in the present embodiment the devices 7, 15 communicate using the modems with the smart meter 5 over the power lines 3, in other embodiments the smart meter 5 and modems may also or alternatively communicate wirelessly or using a wire or wires separate from the mains power line 3.

Communication between the modems associated with the electrical devices 7, 15 and the smart meter 5 takes place according to a protocol that enables the modems to share the same communication medium. Preferably the smart meter 5 acts as a master on the network, sending requests to the modems associated with the electrical devices 7, 15 in turn and receiving by return. In case the smart meter 5 is unable to communicate directly with the modem 'node', the messages may be sent via an intermediary node device 7, 11, 13. The present invention applies equally to other protocols.

The smart meter 5 displays information relating to the consumption of each and all of the electrical devices 7, 15 forming part of the network 1. The smart meter 5 may also store a history of consumption and may communicate the data in some form with, for instance, a personal computer in the home or building or with an electricity supplier. Furthermore, a human interface to the smart meter 5 may allow a user to control electrical equipment.

In addition to the modem described in further detail with reference to FIG. 2, each electrical device 7 or power plug 11 or power adapter 13 preferably includes a current or energy sensor, a relay switch capable of turning the corresponding equipment on or off, an interface capable of driving a thyristor for variable load control, a power supply unit that derives its power from the power line itself, power line coupling with appropriate protection against high voltage and current spikes, analogue amplifiers and filters and analogue-to-digital and digital-to-analogue converters.

Figure 2:
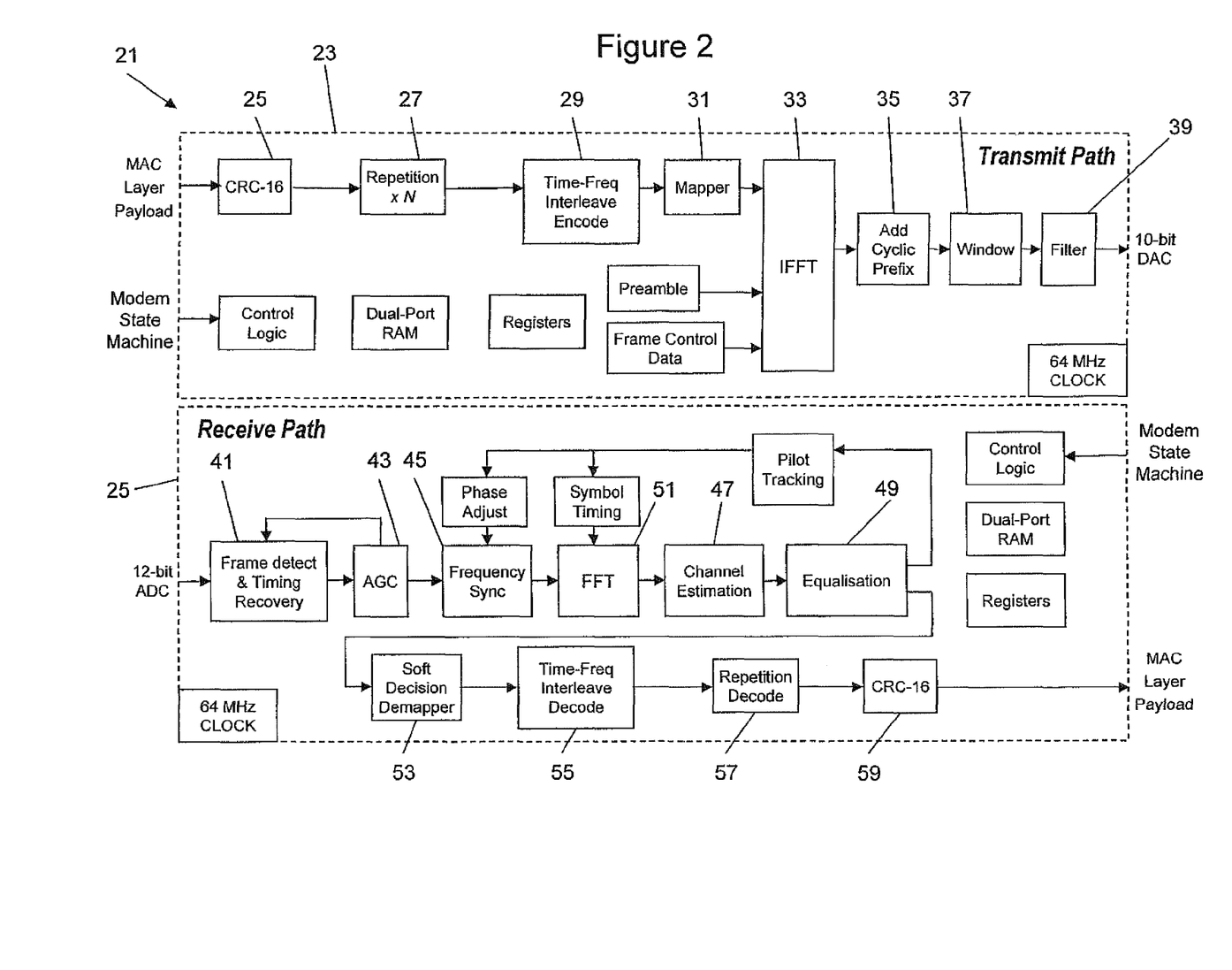
FIG. 2 is a block diagram of an OFDM modem used for communication between parts of the network of FIG. 1.

FIG. 2 is a block diagram of a modem 21 which forms part of the smart meter 5 of the system of FIG. 1 and which forms part of or is associated with the electrical devices 7 of the system of FIG. 1. The modem 21 provides communication capability between the smart meter 5 and electrical devices 7 in the form of a transmitter or transmit side 23 and a receiver or receive side 25. The modem shown in FIG. 2 uses the orthogonal frequency division multiplexing (OFDM) modulation scheme using a frequency band from 0 to 32 MHz. OFDM is a frequency and time two dimension modulation scheme. The frequency band is typically divided into 128 sub-channels or sub-groups, each sub-channel being 250 kHz wide. In the time domain, the sub-carriers are divided into sub-groups of symbols. Each OFDM symbol is typically 4 microseconds in length and is sampled at 64 MHz. It is a feature of OFDM that the signals modulated on each sub-carrier are mutually orthogonal over the duration of an OFDM symbol.

The modem 21 of FIG. 2 is preferably implemented on an Application Specific Integrated Circuit (ASIC). It may, however, also be implemented on a Field Programmable Gate Array (FPGA) or a Digital Signal Processor (DSP) or another similar technology.

To achieve robustness against channel delay spread, typically up to 2 microseconds on power line channels, a cyclic prefix is added to the OFDM symbol of 128 samples. Not all sub-carriers carry data, since frequencies below 1 MHz and above 30 MHz are not used. Additionally, some sub-carriers may be left unused to avoid using frequencies that would otherwise cause interference with other services (e.g., amateur radio bands).

Referring to the transmit side 23, the input data to be transmitted is labelled as the "MAC layer payload". In addition to information relating to the energy consumption of the electrical device 7, the MAC layer payload includes information required for the higher level protocols described above. A 16-bit Cyclic Redundancy Checksum (CRC) is added in CRC block 25 so that the receiver may verify that the demodulated data is correct. After the addition of the CRC bits the time-frequency repetition encoding proceeds. The preferred method for the time-frequency repetition encoding is now described but it will be understood that there are other implementations within the scope of the invention.

Initially each source bit is repeated N times in repetition block 27, where N is chosen to yield the wanted data rate. For instance if 112 sub-channels are each used to carry a Binary Phase Shift Keying (BPSK) symbol then the data rate without repetition would be 19 Mbps (megabits per second) given that each OFDM symbol has a duration of 6 microseconds. If the target data rate is 100 kbps, as is typical of energy management systems, then N is 190.

If we assume that the MAC layer payload plus CRC amounts to Nk bits (the number of source bits) then the code vector after repetition is Nc=Nk*N bits long, where Nc is the number of bits in the code vector. Assuming that there are Nu used sub-carriers and that each sub-carrier is modulated with K bits per symbol then the number of OFDM symbols that will be required to transmit the entire payload is the smallest integer that is greater than or equal to Nofdm=Nc/(K*Nu). For example, the value of K is 1 for BPSK modulation, 2 for QPSK (Quadrature Phase Shift Keying), 4 for 16-QAM (Quadrature Amplitude Modulation) and so on. BPSK is preferably used in this implementation. Pad bits are added so that the code vector fully populates all used sub-carriers of all Nofdm OFDM symbols, as stated above, not all OFDM sub-carriers may be used, for example due to interference suffered by certain sub-carriers. These pad bits may be further copies of data bits, or may be values which are independent of the transmitted data bits. If further copies of data bits are used then it will be appreciated that the pad bits may include repetition of some, but not all, of the data bits, based on the number of pad bits required.

Figure 3:
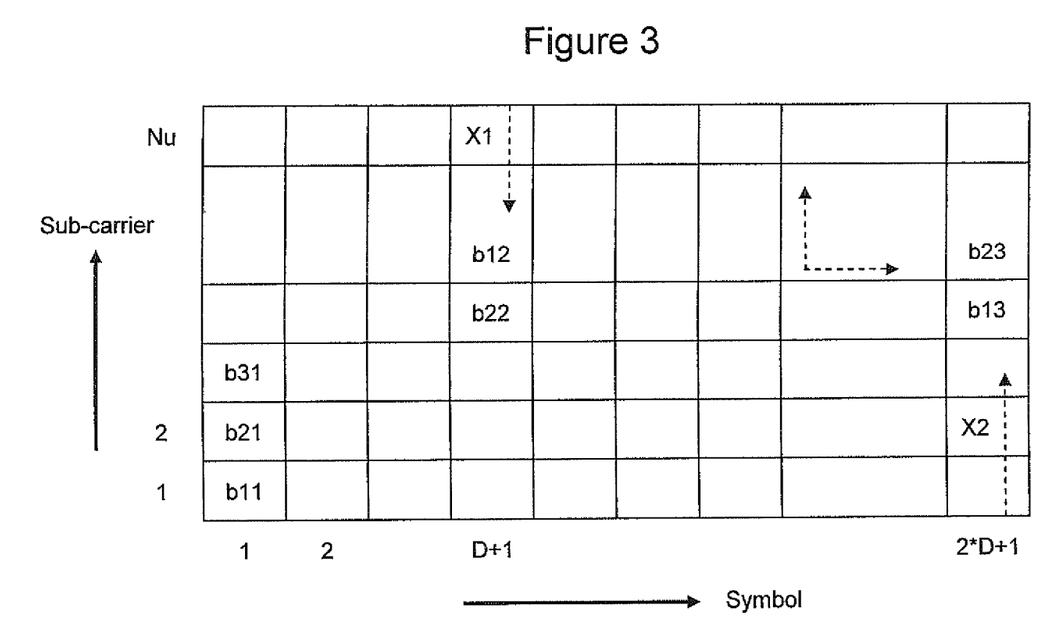
FIG. 3 is matrix showing the allocation of copies of data bits across sub-carriers and symbols in the model of FIG. 2.

Having constructed the code vector as described above the time-frequency interleaver is applied in bit-loading module block 29. For clarity of explanation the method of interleaving is described assuming a repetition rate of just 3 although this is much lower than the repetition rate required for the preferred implementation and the skilled person will have no difficulty in extending this method to higher repetition rates. With each source data bit repeated 3 times the code vector can be represented as Ncode=[b11,b12,b13,b21,b22,b23, . . . ] where bxy represents the y-th repetition of the x-th source bit. The aim of the interleaving is to spread the 3 copies of each source bit as widely as possible across the sub-groups in the time domain and the sub-groups in the time domain, in the time-frequency matrix. The time-frequency matrix is illustrated in FIG. 3 to which reference is made in the description of the bit-loading method.

In this embodiment, the first copy of each code-bit is placed, in turn, on the lowest available sub-carrier (frequency domain sub-group) on the lowest (first) available OFDM symbol (time domain sub-group). So, as illustrated in FIG. 3, b11 is placed on sub-carrier 1 in symbol 1, b21 is placed on sub-carrier 2 in symbol 1 and so on filling up the first symbol before, if necessary, moving on to the second symbol. The second copy of source data bit 1, b12, is then placed in the OFDM symbol D symbols later than the symbol carrying b11 on the sub-carrier X1 available sub-carriers from the highest sub-carrier Nu. D and X1 are parameters of the bit loading algorithm. The third copy of the first source bit, b13, is then placed a further D symbols from b12 on the X2-th available sub-carrier from the lowest sub-carrier. X2 is a further parameter of the bit-loading algorithm.

In general, if there are M copies of each source bit then the parameters of the bit-loading algorithm are D and X1, X2, . . . , X[M-1]. The same algorithm is used for the copies of the second source data bit, but because the copies of the first source bit, b12 and b13, already occupy sub-carriers in symbols D+1 and 2D+1 the above algorithm results in b22 and b23 being placed in adjacent sub-carriers to b12 and b13 respectively, as shown in FIG. 3. In general the k-th copy of the first source data-bit, b1$k$, will be placed in OFDM symbol number kD+1, but this may exceed the total number of OFDM symbols, Nofdm. In this case the symbol counting wraps cyclically so b1$k$ is in fact placed in the symbol kD+1 modulus Nofdm.

This bit-loading method generalizes easily to any number of source data bits and any number of repetitions of each source data bit. The bit-loading method defines a position of a second copy of the data bit according to a progression with respect to the position of the first copy of the data bit. In this embodiment a separation between sub-groups used for copies of the same data bit in the frequency dimension is greater than a coherence bandwidth of the channel and a separation between sub-groups used for copies of the same data bit in the time dimension is greater than the maximum delay spread of the channel.

The skilled person will understand that other predetermined arrangements of bit-loading may be used within the scope of the appended claims. For example, the progression for one or more dimension may be based on a predetermined function such as an arithmetic function or a pseudo-random function. In the specific embodiment described above the position of the first and second copies of the data bits within the sub-carrier sub-groups is set based on respectively the first and last sub-carrier and the skilled person will understand that this is merely one example of a predetermined arrangement for position copies of data bits within the frequency-time matrix.

The progression for one or more dimension may be based on a fixed or a non-fixed offset. The skilled person will appreciate that any predetermined arrangement for setting the position of the copies of the data bits within the two dimensional matrix may be used, as long as the arrangement is known at both the transmitter and the receiver.

If the original source data has been encoded according to a Forward Error Correction (FEC) code before the time-frequency interleaving, then a different bit-loading scheme may provide better robustness since the aim in this circumstance is to avoid patterns of errors to which the FEC is vulnerable.

Figure 4:
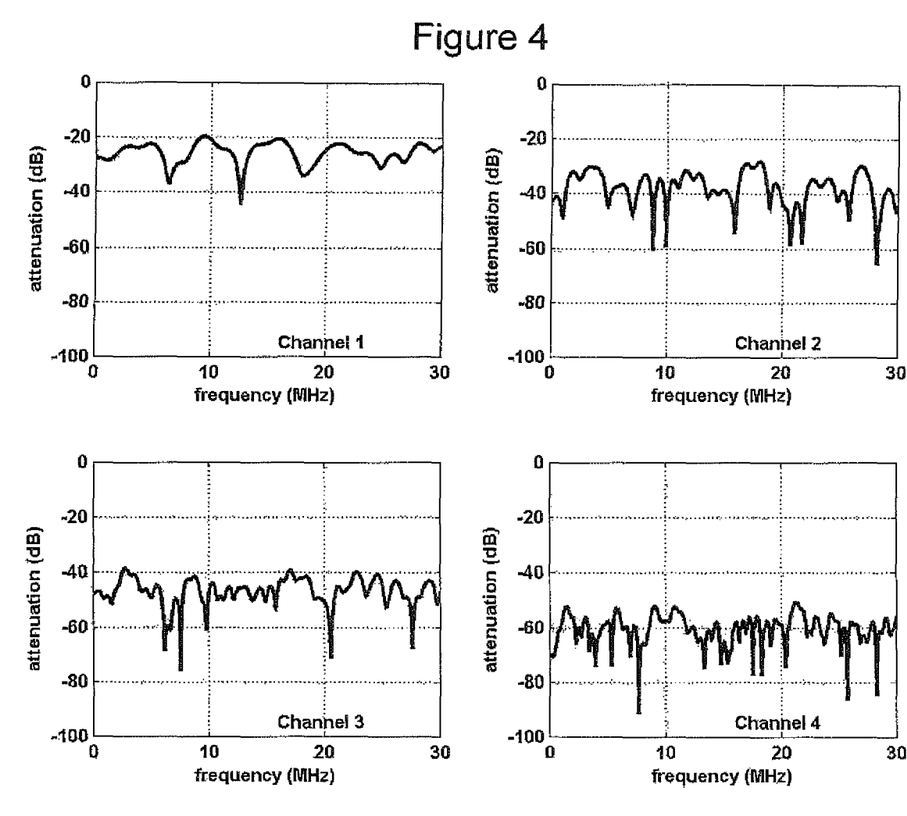
FIG. 4 shows typical in-home power line channels characteristics.

FIG. 4 shows typical in-home power line channels ranging from benign to severe. The two most obvious characteristics are the attenuation and the strongly frequency dependent fading. On the other hand a power line channel is typically rather static in the sense that the fading generally does not change over the time of a transmitted frame. Spreading multiple copies of the data bits widely across sub-carrier sub-groups mitigates this situation by attempting to ensure that each source data bit is transmitted on at least one frequency that is not subject to severe fading.

Two other features of power line channels are narrow-band interferers and impulsive noise. Narrow-band interferers generally effect one or few sub-carriers but are often powerful enough to make it unpractical to transmit any data on that sub-carrier. Again, the frequency interleaving aspect of the invention provides immunity to such interferers.

Impulsive noise often originates from electric motors or dimmer switches and will generally last for a few OFDM symbols. The result is a very high level of noise for that period and the time interleaving aspect of the invention is designed to provide immunity to such impulsive noise by maximally spreading the copies of the source data bits across time sub-groups.

The above embodiment of the invention describes a method of bit-loading that is not related to the specific channel or interference conditions. Other embodiments map copies of source data bits according to an arrangement based on particular knowledge of the channel or interferers. Furthermore, this arrangement may change dynamically as the channel or interference changes. This requires the transmitter to have knowledge of the channel and interferers which can be achieved, for example, by channel sounding. Channel sounding generally involves the transmission and reception of a known signal that allows the receiver to assess the prevailing channel and interference characteristics.

Following the time-frequency interleaving in block 29, the symbols are mapped in mapper block 31 onto BPSK symbols. In other embodiments QPSK and QAM are used. Subsequently, the OFDM symbols are passed one at a time through the Inverse Fast Fourier Transform (IFFT) function block 33 which transforms the symbol from the frequency domain to the time domain. This is a well-known method of implementation of OFDM modulation. A cyclic prefix of 128 samples, corresponding to 2 microseconds, is then added in block 35, so that the received OFDM symbols are free from inter-symbol interference that results from channel delay spread. Following this a window filter is applied in block 37 and a digital filter is applied in block 39. These filters shape the transmitted frequency spectrum without destroying the orthogonality of the symbols on each sub-carrier, as is well-known to those skilled in the art of digital transmitters.

The resulting stream of digital values is then passed to the analogue front end (AFE) (not shown) that converts these values to analogue signals using a combination of sampling, filtering, amplification and coupling.

FIG. 2 also shows a block diagram of the receive side 25 of the modem 21. The frame detect and timing recovery 41, Automatic Gain Control (AGC) 43, timing and frequency synchronization 45, channel estimation 47, equalization 49 and Fast Fourier Transform (FFT) 51 blocks are standard features of an OFDM receiver. For a low complexity implementation a single-tap zero-forcing equalizer is used. The FFT block 51 performs the inverse operation of the IFFT block 33, transforming a time domain signal to a frequency domain signal. The size of the FFT and sampling frequency match those in the transmitter side 23 so that the outcome of these functions is a series of complex numbers which are the received versions of the symbols transmitted on each sub-carrier and each OFDM symbol. In addition, the channel estimation block 47 provides information about the signal-to-noise ratio and hence confidence of the received values. The soft-decision demapper 53 assigns a likelihood value to each received information bit. With the BPSK scheme this is a value that indicates the likelihood of a given data bit having had the value 1. In a low complexity receiver side 25 this may be a so-called hard decision decoder, the output of which is simply a decision on whether the received bit had value 1 or 0 without any indication of confidence in that judgement.

In a hard decision decoder the method of recovering each source bit is a simple majority vote. A simple majority vote assigns the value 1 to a source data bit if more than half of the received copies of that source data bit were 1. This solution has the advantage of low complexity but sacrifices the use of information about the confidence of each bit. To make use of the confidence of the received value of each copy of a source bit several alternative methods are proposed:

a. A majority vote from a sub-set of at least one of the received copies of a source data-bit selected according to the likelihood values b. Maximum likelihood, or maximum log likelihood, estimation of the values using all or a sub-set of the likelihood values from the received copies of the source data bit.

Maximum Likelihood Estimation is a well known technique in data decoding. An alternative to Maximum Likelihood Estimation may be employed that similarly applies weights to each of the received copies of a data-bit representative of the confidence in the received value of each, and combines them to give an improved estimation of the original source data-bit.

As indicated in FIG. 2 the implementation of the decoding algorithms described above requires time-frequency decoding in block 55 which is the inverse of the interleaving operation of the transmitter side 23 implemented in block 29 in order to identify the copies of each source bit. The repetition decode block 57 then deals with estimation of the original source data-bit given the values of the received copies. Finally the CRC, the inverse of that applied at the transmitter, is applied in block 59 to check the validity of the received data.

In a further embodiment of the invention analogue vector addition is used to recover the data bits. In this arrangement the analogue values of each repeated data bit are recovered from the FFT and summed, thereby taking advantage of the uncorrelated property of most forms of noise. Standard threshold decision coding is then applied to the result to recover the data before the inverse CRC is applied to check data validity. Further the analogue value of each repeated data bit can be weighted by a confidence factor derived from the measured signal to noise ratio of the carrier on which it was modulated or some other measure derived from channel measurement or estimation. In this scheme the vector representing each received copy of a data bit is scaled before being summed with all the other analogue values of the same repeated data bit.

Various modifications will be apparent to those in the art and it is desired to include all such modifications as fall within the scope of the accompanying claims.

For example, the above embodiment is described with reference to a two dimensional modulation scheme where the dimensions are time and frequency. The bit-loading method can be used in other two dimension modulation schemes, such as time and code modulation schemes such as code division multiple access (CDMA). The bit-loading method can also be applied to a three dimension modulation scheme where the dimensions are frequency, time and code.

The above embodiment in the frequency-time domain is described with reference to OFDM. The bit-loading method may be applied to other frequency-time modulation schemes such as (non-orthogonal) frequency division multiplexing (FDM) and a spread spectrum modulation scheme such as frequency hopping spread spectrum (FHSS) and multi-carrier spread spectrum (MCSS).

The invention claimed is:

1. A method for transmitting data via a power-line network, the method comprising:
    receiving data bits to be transmitted;
    loading multiple copies of the data bits in a multi-dimension modulation scheme matrix, the dimensions being selected from frequency, time and code, each dimension being divided into sub-groups,
    allocating copies of each data bit within the matrix according to a predetermined arrangement so that within each dimension copies of the same data bit reside within different sub-groups; wherein within each dimension the predetermined arrangement specifies positions of the copies of the data bits, such that the position of each successive copy of a respective data bit is specified according to a progression with respect to the position of the preceding copy of that data bit;
    wherein the progression for one or more of the dimensions is based on an arithmetic function, and wherein for one or more of the dimensions, the number of sub-groups between successive copies of a respective data bit varies across the matrix;
    modulating a signal in accordance with the modulation scheme matrix; and
    transmitting the signal via a mains power line.

2. The method as claimed in claim 1, wherein the dimensions comprise code and time.

3. The method as claimed in claim 2, wherein the signal is modulated using code division multiple access (CDMA).

4. The method as claimed in claim 2, wherein the signal is transmitted via a channel, the channel having a coherence bandwidth and maximum delay spread; and
    a separation between sub-groups used for copies of the same data bit in the frequency dimension is greater than the coherence bandwidth of the channel or
    wherein a separation between sub-groups used for copies of the same data bit in the time dimension is greater than the maximum delay spread of the channel.

5. The method as claimed in claim 1, wherein the dimensions comprise frequency and time.

6. The method as claimed in claim 5, wherein the signal is modulated using one of frequency division multiplexing (FDM), orthogonal frequency division multiplexing (OFDM) and a spread spectrum modulation scheme such as frequency hopping spread spectrum (FHSS) and multi-carrier spread spectrum (MCSS).

7. The method as claimed in claim 6, wherein the signal is transmitted using OFDM, the frequency dimension is divided into sub-groups of sub-carriers and the time dimension is divided into a sub-groups of symbols.

8. The method as claimed in claim 1 wherein the predetermined arrangement is selected based on channel and/or interference characteristics.

9. The method as claimed in claim 8, wherein the predetermined arrangement is changed dynamically as the channel or interference changes.

10. The method as claimed in claim 1, wherein for each sub-group used in a first dimension, all sub-groups are fully populated in a second dimension.

11. The method as claimed in claim 10, wherein the sub-groups used in the first dimension are non-contiguous.

12. The method as claimed in claim 10, wherein the sub-groups used in the first dimension are contiguous.

13. The method as claimed in claim 10, wherein the fully populated sub-groups in the second dimension are populated with data bits and pad bits.

14. A non-transitory carrier medium carrying computer readable code for controlling a microprocessor to carry out the method of claim 1.

15. A transmitter comprising:
    means for receiving data bits to be transmitted;
    a bit-loading module for loading multiple copies of data bits in a multi-dimension modulation scheme matrix, the dimensions being selected from frequency, time and code, each dimension being divided into sub-groups, wherein the module is configured to allocate copies of each data bit within the matrix according to a predetermined arrangement so that within each dimension copies of the same data bit reside within different sub-groups, wherein within each dimension the predetermined arrangement specifies positions of the copies of the data bits, such that the position of each successive copy of a respective data bit is specified according to a progression with respect to the position of the preceding copy of that data bit;
    wherein the progression for one or more of the dimensions is based on an arithmetic function, and wherein for one or more of the dimensions, the number of sub-groups between successive copies of a respective data bit varies across the matrix;
    means for modulating a signal in accordance with the modulation scheme; and
    means adapted to transmit the modulated signal via a mains power line.

16. The transmitter as claimed in claim 15, wherein the mains power line is within a building.

17. The transmitter as claimed in claim 15, wherein the mains power line is between buildings.

18. The transmitter as claimed in claim 15, wherein the data bits are encoded according to a forward error correction scheme.

19. The transmitter as claimed in claim 15, wherein the data bits are not encoded according to a forward error correction scheme.

20. A receiver comprising:
    means adapted to receive, via a mains power line, data bits that are encoded as a signal that is modulated in multiple dimensions selected from time, frequency and code, the modulation being based on a multi-dimension modulation scheme matrix in which each dimension of the matrix is divided into sub-groups with copies of the respective data bits being arranged in the matrix according to a predetermined arrangement, such that within each dimension copies of the same data hit reside within different sub-groups, wherein within each dimension the predetermined arrangement specifies positions of the copies of the data bits, such that the position of each successive copy of a respective data bit is specified according to a progression with respect to the position of the preceding copy of that data bit;

wherein the progression for one or more of the dimensions is based on an arithmetic function, and wherein for one or more of the dimensions, the number of sub-groups between successive copies of a respective data bit varies across the matrix;

means for demodulating the modulated signal in accordance with the multi-dimension scheme matrix;

a decoding module for decoding the demodulated signal to recover copies of the data bits on which the modulation is based; and means for determining a value of the received data bits.

21. The receiver as claimed in claim 20, wherein the value of the received data bits is determined by a majority vote using the received values of each copy of that bit or using the received values of a subset of the copies of that bit.

22. The receiver as claimed in claim 21, wherein the value of the received data bits is determined by a majority vote using the received values of a subset of the copies of that bit, and wherein the subset of copies is determined according to a confidence threshold in the value of each copy.

23. The receiver as claimed in claim 20, wherein the value of each data bit at the receiver is determined by calculating a weight representing a confidence in the value of each received copy of that bit, and combining the weights from each copy to reach a decision.

24. The receiver as claimed in claim 23, wherein the weights are determined according to information about a signal-to-noise ratio of each received copy of the data bit.

25. The receiver as claimed in claim 20, wherein the value of each received bit is determined according to a maximum likelihood basis.

26. The receiver as claimed in claim 20, wherein each data bit value is determined by summing an analogue representation of the repeated copies of that data bit.

27. The receiver as claimed in claim 26, wherein each data bit value is determined by applying a weighting factor to an analogue received value to each copy of that data bit dependent on a signal-to-noise ratio of the sub-group on which that copy was modulated, thereby to create a weighted analogue representation of the copy of that data bit; and summing weighted analogue representations of all copies of that data bit.

28. The receiver as claimed in claim 20, wherein the data bit value is determined by using an algorithm that adapts a recombination method according to prevailing conditions.

29. A modem comprising:
a transmitter comprising:
  means for receiving data bits to be transmitted;
  a bit-loading module for loading multiple copies of data bits in a multi-dimension modulation scheme matrix, the dimensions being selected from frequency, time and code, each dimension being divided into sub-groups, wherein the module is configured to allocate copies of each data bit within the matrix according to a predetermined arrangements so that within each dimension copies of the same data bit reside within different sub-groups, wherein within each dimension the predetermined arrangement specifies positions of the copies of the data bits, such that the position of each successive copy of a respective data bit is specified according to a progression with respect to the position of the preceding copy of that data bit, wherein the progression for one or more of the dimensions is based on an arithmetic function, and wherein for one or more of the dimensions, the number of sub-groups between successive copies of a respective data bit varies across the matrix;
  means for modulating a signal in accordance with the modulation scheme; and
  means adapted to transmit the modulated signal via a mains power line; and a receiver comprising:
  means adapted to receive the modulated signal via the mains power line;
  means for demodulating the modulated signal in accordance with the multi-dimension modulation scheme matrix;
  a decoding module for decoding the demodulated signal to recover copies of the data bits on which the modulation is based; and
  means for determining a value of the received data bits.

30. A communications system comprising a channel and a modem as claimed in claim 29.

31. A communications system as claimed in claim 30, wherein each modem is part of or associated with an electrical device connected to the mains power line.

32. A communications system comprising:
a transmitter for transmitting a signal, the transmitter comprising:
  means for receiving data bits to be transmitted;
  a bit-loading module for loading multiple copies of data bits in a multi-dimension modulation scheme matrix, the dimensions being selected from frequency, time and code, each dimension being divided into sub-groups,
  wherein the module is configured to allocate copies of each data bit within the matrix according to a predetermined arrangements so that within each dimension copies of the same data bit reside within different sub-groups;
  wherein within each dimension the predetermined arrangement specifies positions of the copies of the data bits, such that the position of each successive copy of a respective data bit is specified according to a progression with respect to the position of the preceding copy of that data bit, wherein the progression for one or more of the dimensions is based on an arithmetic function, and wherein for one or more of the dimensions, the number of sub-groups between successive copies of a respective data bit varies across the matrix;
  means for modulating a signal in accordance with the modulation scheme; and
  means adapted to transmit the modulated signal via a mains power line; a channel on which the transmitted signal is to he carried; and a receiver for receiving the transmitted signal, the receiver comprising:
  means adapted to receive the modulated signal via the mains power line;
  means for demodulating the modulated signal in accordance with the multi-dimension modulation scheme matrix;
  a decoding module for decoding the demodulated signal to recover copies of the data bits on which the modulation is based; and
  means for determining a value of the received data bits.

* * * * *